(12) United States Patent
Gadams et al.

(10) Patent No.: US 12,546,479 B2
(45) Date of Patent: Feb. 10, 2026

(54) MODULAR STEAM COOKING SYSTEM FOR A HOME COOKING APPLIANCE

(71) Applicants: BSH Home Appliances Corporation, Irvine, CA (US); BSH Hausgeräte GmbH, Munich (DE)

(72) Inventors: Jeffery Gadams, Stella, NC (US); Sean Johnson, New Bern, NC (US); Kenneth Jones, Washington, NC (US); George Savitz, New Bern, NC (US)

(73) Assignees: BSH Home Appliances Corporation, Irvine, CA (US); BSH Hausgeräte GmbH, Munich (DE)

( * ) Notice: Subject to any disclaimer, the term of this patent is extended or adjusted under 35 U.S.C. 154(b) by 608 days.

(21) Appl. No.: 17/978,248

(22) Filed: Nov. 1, 2022

(65) Prior Publication Data
US 2024/0142108 A1    May 2, 2024

(51) Int. Cl.
*F24C 15/00*    (2006.01)
*F24C 15/18*    (2006.01)
*F24C 15/32*    (2006.01)

(52) U.S. Cl.
CPC ............ *F24C 15/003* (2013.01); *F24C 15/18* (2013.01); *F24C 15/327* (2013.01)

(58) Field of Classification Search
CPC ...... F24C 15/003; F24C 15/18; F24C 15/327; F24C 15/164; F24C 15/166; A21B 3/04; A47J 27/04

(Continued)

(56) References Cited

U.S. PATENT DOCUMENTS 2,623,516 A * 12/1952 Salem .................. A47J 36/064
                                                126/299 C
2,625,176 A *  1/1953 Williams ............... E03C 1/046
                                                261/DIG. 26

(Continued)

FOREIGN PATENT DOCUMENTS

CN     200320118994 Y    12/2004
CN        209284234 U *   8/2019 ............... A23L 7/10

(Continued)

OTHER PUBLICATIONS

Chinese to English machine translation of CN209284234U.*
Chinese to English machine translation of CN210902647U.*

*Primary Examiner* — Michael G Hoang
*Assistant Examiner* — Elizabeth Ann Laughlin
(74) *Attorney, Agent, or Firm* — Michael E. Tschupp; Andre Pallapies; Brandon G. Braun

(57) ABSTRACT

A modular steam production system for a home cooking appliance, and a home cooking appliance having a modular steam production system, are provided. The modular steam production system includes a steam generating unit having a heating element for generating steam from water, a water reservoir for storing a quantity of the water and being fluidly coupled to the steam generating unit, a controlled water release system including a valve movable between a closed position and an open position to control a release of the water from the water reservoir into the steam generating unit and thereby controlling a volume of steam generated by the steam generating unit, and a mechanical connection configured to engage a corresponding mechanical connection on the home cooking appliance to provide motive power to the controlled water release system to actuate an opening and closing of the valve.

17 Claims, 9 Drawing Sheets

(58) Field of Classification Search
USPC .......................................................... 126/369
See application file for complete search history.

(56) References Cited

U.S. PATENT DOCUMENTS

| | | | |
|---|---|---|---|
| 3,570,704 A * | 3/1971 | Roson ...................... | A47J 27/08 |
| | | | 220/203.02 |
| 3,639,725 A | 2/1972 | Maniscalco | |
| 5,295,505 A * | 3/1994 | Polaschegg ......... | A61M 1/1666 |
| | | | 210/321.71 |
| 8,369,695 B2 * | 2/2013 | Lee ....................... | F24C 15/327 |
| | | | 392/394 |
| 9,066,523 B2 | 6/2015 | Seitz | |
| 10,955,142 B2 * | 3/2021 | Swayne ................... | F24C 15/16 |
| 2006/0033061 A1 * | 2/2006 | van Mast .................... | B01J 3/03 |
| | | | 251/93 |
| 2007/0062927 A1 * | 3/2007 | Sells ..................... | F24C 15/327 |
| | | | 219/401 |
| 2017/0356659 A1 * | 12/2017 | Chen ....................... | F24C 15/10 |

FOREIGN PATENT DOCUMENTS

| | | | | |
|---|---|---|---|---|
| CN | 210902647 U | * | 7/2020 | .............. A47J 27/04 |
| EP | 1557612 B1 | | 12/2006 | |
| EP | 2244010 A2 | | 10/2010 | |
| KR | 100848912 B1 | | 7/2008 | |

* cited by examiner

MODULAR STEAM COOKING SYSTEM FOR A HOME COOKING APPLIANCE

FIELD OF THE INVENTION

The present invention is directed to a removable modular steam cooking system for an oven cavity of a home cooking appliance, and more particularly, to a home cooking appliance having such a removable modular steam cooking system.

BACKGROUND OF THE INVENTION

Steam cooking functions have become desirable to some residential users of cooking appliances. Some conventional home cooking appliances may provide steam assisted cooking functions or include a separate steam oven configured for steam cooking, in addition to a conventional baking or convention oven.

SUMMARY OF THE INVENTION

The present invention recognizes that conventional home cooking appliances having steam assist functions or steam ovens may be complex or cumbersome for a user to set up and operate, and may not provide sufficient control or regulation, or any control or regulation, of the volume of steam being generated by the appliance. Furthermore, such conventional home cooking appliances may be limited in size due to conventional equipment requirements compared to a conventional baking or convention oven.

These problems and others are addressed by the present invention, a first exemplary embodiment of which comprises a modular steam production system for a home cooking appliance, the system comprising a steam generating unit having a heating element for generating steam from water, a water reservoir for storing a quantity of the water, the water reservoir being fluidly coupled to the steam generating unit, a controlled water release system including a valve movable between a closed position and an open position to control a release of the water from the water reservoir into the steam generating unit and thereby controlling a volume of steam generated by the steam generating unit, and a mechanical connection configured to engage (e.g., releasably engage) a corresponding mechanical connection on the home cooking appliance to provide motive power to the controlled water release system to actuate an opening and closing of the valve.

In this way, the present invention can provide a modular steam production system that is portable and can be simply and easily inserted or removed from a home cooking appliance as a user wishes. Moreover, the present invention can provide control of the volume of steam being generated by the appliance when the modular steam production system is in use. More particularly, the present invention can provide controlled release of the water from the water reservoir into the steam generating unit to thereby control a volume of steam generated by the steam generating unit. The present invention also can enable variable control of the volume of steam generated by the appliance, thereby allowing for more or less steam as needed depending on the particular items being cooked, the particular cooking process or program, etc. Furthermore, the modular design can allow for use of the modular steam production system within a baking or convention oven, thereby providing a larger cooking space for steam cooking operation while also providing maximum oven capacity when the system is removed from the cooking compartment of the household cooking appliance.

In an example, the valve of the controlled water release system can control a rate of release of the water from the water reservoir into the steam generating unit. In other examples, the valve can provide a variable rate of release of the water from the water reservoir into the steam generating unit. In still other examples, the valve can provide an intermittent release of the water from the water reservoir into the steam generating unit.

In another example, the modular steam production system can further comprise at least one electrical connection configured to engage (e.g., releasably engage) a corresponding electrical connection on the home cooking appliance to provide power to the heating element of the steam generating unit from the home cooking appliance.

In another example, the modular steam production system can further comprise a fill port fluidly coupled to the water reservoir for supplying the quantity of the water to the water reservoir, wherein the fill port is an unsealed opening fluidly connected to the water reservoir, thereby avoiding a risk of pressurization or over-pressurization. In some examples, the fill port includes an elongated neck, thereby reducing a risk of boil-over or spilling during positioning of the modular steam production system in a home cooking appliance and/or during generation of steam by the modular steam production system.

In an example, the modular steam production system can further comprise at least one vent fluidly connecting a steam cavity of the steam generating unit to an exterior of the modular steam production system. An interior surface of the steam cavity can be tapered to guide the generated steam to the at least one vent. Similarly, an exterior surface of the water reservoir facing the steam cavity can be tapered to guide the generated steam to the at least one vent.

In an example, an interior surface of the water reservoir can be tapered to guide the water to the valve.

In a particular example, the water reservoir can include an outlet opening fluidly connecting an interior cavity of the water reservoir to a steam cavity of the steam generating unit. The valve can be movable between the closed position and the open position to regulate a sealing and an unsealing of the outlet opening. The controlled water release system can further comprise a rod having the valve fixed at a first end thereof and a follower plate fixed at a second end thereof, wherein an assembly of the rod, valve, and follower plate are movable linearly together in a direction of an axis of the outlet opening, a spring disposed between the follower plate and the outlet opening and biasing the follower plate in a direction away from the outlet opening, a cam having a surface defining a cam profile, wherein the surface of the cam engages the follower plate, and a shaft fixed to the cam and coupling the cam to the mechanical connection. The cam can be rotatable by rotating the shaft via the mechanical connection.

Another exemplary embodiment of the invention comprises a household appliance having a modular steam production system according to the examples of the present invention. The household appliance can include a housing having a cooking compartment, a corresponding mechanical connection disposed within the cooking compartment, and a modular steam production system removably disposed in the cooking compartment such that the mechanical connection of the modular steam production system is engaged (e.g., releasably engaged) with the corresponding mechanical connection. The corresponding mechanical connection can provide the motive power to the controlled water release system via the mechanical connection to actuate the opening and closing of the valve.

In an example, the household appliance can include a control unit configured to control operation of the corresponding mechanical connection to control a rate of release of the water by the valve from the water reservoir into the steam generating unit. In another example, the household appliance can include a control unit configured to control the operation of the corresponding mechanical connection to provide a variable rate of release of the water by the valve from the water reservoir into the steam generating unit.

In an example, the water reservoir of the modular steam production system can include an outlet opening fluidly connecting an interior cavity of the water reservoir to a steam cavity of the steam generating unit and the valve can be movable between the closed position and the open position to regulate a sealing and an unsealing of the outlet opening. The controlled water release system can further comprise a rod having the valve fixed at a first end thereof and a follower plate fixed at a second end thereof, wherein an assembly of the rod, valve, and follower plate are movable linearly together in a direction of an axis of the outlet opening, a spring disposed between the follower plate and the outlet opening and biasing the follower plate in a direction away from the outlet opening, a cam having a surface defining a cam profile, wherein the surface of the cam engages the follower plate, and a shaft fixed to the cam and coupling the cam to the mechanical connection. In another example, the household appliance can further comprise a motor coupled to the corresponding mechanical connection and configured to rotate the shaft via the mechanical connection, and a control unit configured to control operation of the motor, wherein the control unit is configured to control a rate of release of the water by the valve from the water reservoir into the steam generating unit by controlling a speed of rotation of the shaft by the motor via the corresponding mechanical connection. In this way, in operation, as the motor turns the shaft, the cam pushes the spring-loaded follower plate, along with the rod and valve, causing an up and down motion and a corresponding movement of the valve between the closed position and the open position to regulate a sealing and an unsealing of the outlet opening. The speed of the motor can determine the rate of water release onto the heating element of the steam generator.

According to the exemplary features and embodiments, the present invention can provide a modular steam production system that is portable and can be simply and easily inserted or removed from a home cooking appliance as a user wishes. The present invention can provide control of the volume of steam being generated by the appliance when the modular steam production system is in use, and more particularly, provide controlled release of the water from the water reservoir into the steam generating unit to thereby control a volume of steam generated by the steam generating unit. The present invention also can enable variable control of the volume of steam generated by the appliance, thereby allowing for more or less steam as needed depending on the particular items being cooked, the particular cooking process or program, etc. Furthermore, the modular design can allow for use of the modular steam production system within a baking or convention oven, thereby providing a larger cooking space for steam cooking operation while also providing maximum oven capacity when the system is removed from the cooking compartment of the household cooking appliance. The home cooking appliance can be configured to operate as both a conventional oven (e.g., when the modular steam cooking unit is removed from the cooking compartment) and a steam oven (e.g., when the modular steam cooking unit is positioned within the cooking compartment and connected to the connection unit).

Additionally, the modular steam production system according to the invention can provide for simple placement and engagement (e.g., releasable engagement) of one or more connections on the modular steam production system with one or more corresponding connections on the home cooking appliance, such as one or more connections within the cooking compartment. For example, the modular steam production system can be installed on a specific rack location within the cooking compartment, whereupon installation (e.g., slide-in installation), a mechanical connection or probe of, for example, a water release cam shaft and/or an electrical connection or probe of, for example, a heater element, can engage (e.g., automatically engage, releasably engage, etc.) with one or more corresponding connections or points in the cooking compartment of the home cooking appliance, thereby providing motive power to the water release cam shaft, such as rotational actuation, and/or providing power to the heater element of the steam generating unit. The corresponding connections points can be provided, for example, on a rear wall of the cooking compartment. The corresponding connections points can extend away from the rear wall, be surface mounted on the rear wall, be recessed into the rear wall, or housed by another component on or near the rear wall. In other examples, the corresponding connections points can be provided at other locations within the cooking compartment, such as on or proximate another wall of the cooking compartment, a support surface or rack within the cooking compartment, etc.

In this way, the modular steam production system can be configured to be powered, actuated, and/or controlled by the home cooking appliance. For example, the water release mechanism can be powered by a motor located external to the cooking compartment similar to a rotisserie system. As the motor turns the shaft, a cam pushes a spring-loaded plunger causing an up and down motion. The speed of the motor will determine the rate of water release onto the steam generator. The steam generator is powered via power ports on the rear of the oven cavity.

The modular steam production system also can be configured to be powered, actuated, and/or controlled by a control unit of the home cooking appliance, thereby providing greater control of a volume of steam generated by the steam generating unit, and in some cases, providing variable control of the volume of steam generated by the appliance, thereby allowing for more or less steam as needed depending, for example, on the particular items being cooked, the particular cooking process or program selected by a user, etc.

For purposes of this disclosure, a "control unit" is intended to be understood, in particular, as an electronic unit which preferably is at least partially integrated in a control unit and/or regulating unit of a home cooking appliance, and which is preferably provided to control and/or regulate at least a cooking operation in a cooking compartment of the home cooking appliance. Preferably, the control unit comprises a processor or computation unit and, in particular additionally to the processor or computation unit, a memory unit with a control program and/or regulating program which is stored therein and which is provided to be implemented by the processor or computation unit. The control unit is provided, in particular, for controlling one or more cooking processes, such as a baking or convection cooking process and/or steam cooking process, controlling one or more operations or functions of various components of the home cooking appliance, controlling operation of one or more components of the modular steam production unit or other components of the home cooking appliance related to the operation of the modular steam production unit and/or one or more associated steam cooking processes, among other things. Advantageously, in an operating mode, the control unit is provided for controlling the operation of the steam generating unit, and particularly controlling operation of the heating element of the steam generating unit, and/or controlling operation of the controlled water release system, and particularly controlling the valve movable between a closed position and an open position to control a release of the water (e.g., a rate of release of the water, such as a variable rate of release, intermittent rate of release, etc.) from the water reservoir into the steam generating unit and thereby controlling a volume and rate of steam generated by the steam generating unit, and/or carrying out a steam heating process of the home cooking appliance.

Other features and advantages of the present invention will become apparent to those skilled in the art upon review of the following detailed description and drawings.

BRIEF DESCRIPTION OF THE DRAWINGS

These and other aspects and features of embodiments of the present invention will be better understood after a reading of the following detailed description, together with the attached drawings, wherein.

DETAILED DESCRIPTION OF THE EXEMPLARY EMBODIMENTS OF THE INVENTION

Figure 1:
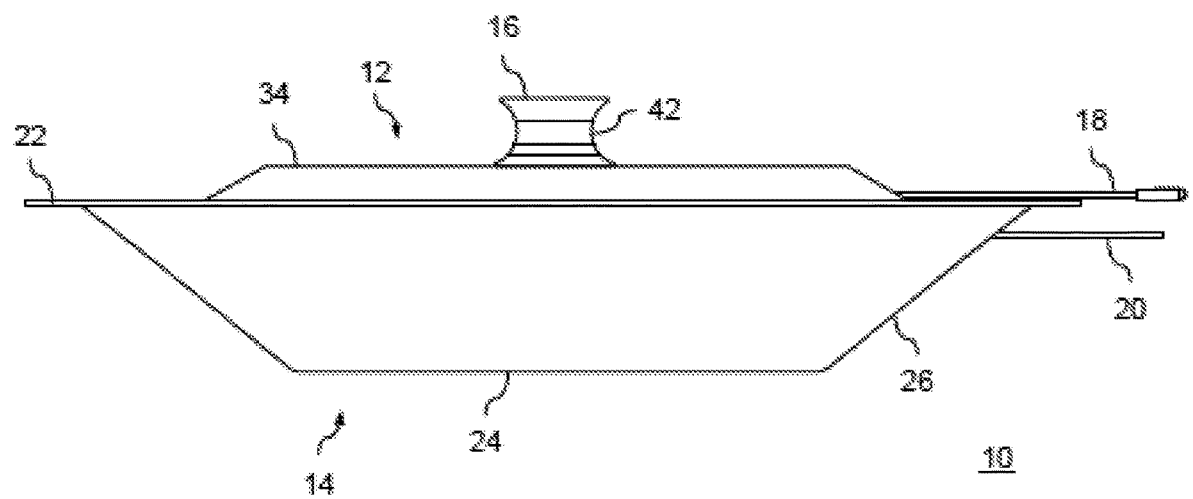
FIG. 1 is a side view of a modular steam production system according to an exemplary embodiment of the invention.
Figure 2:
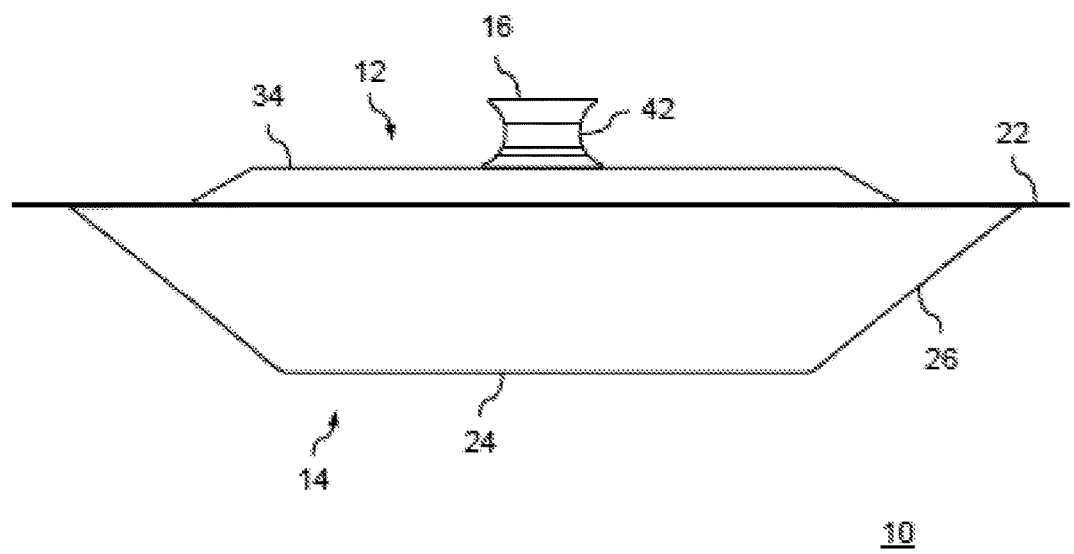
FIG. 2 is a front view of a modular steam production system according to an exemplary embodiment of the invention.
Figure 3:
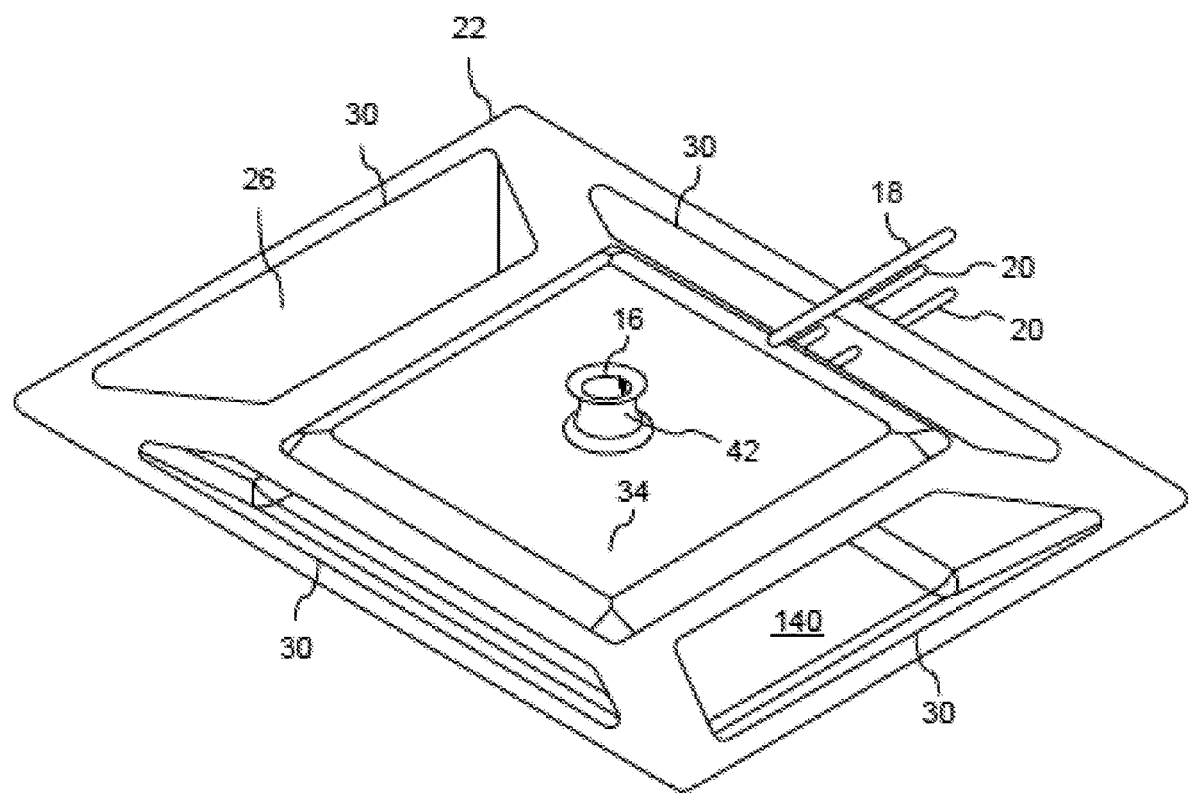
FIG. 3 is a perspective view of a modular steam production system according to an exemplary embodiment of the invention.
Figure 4:
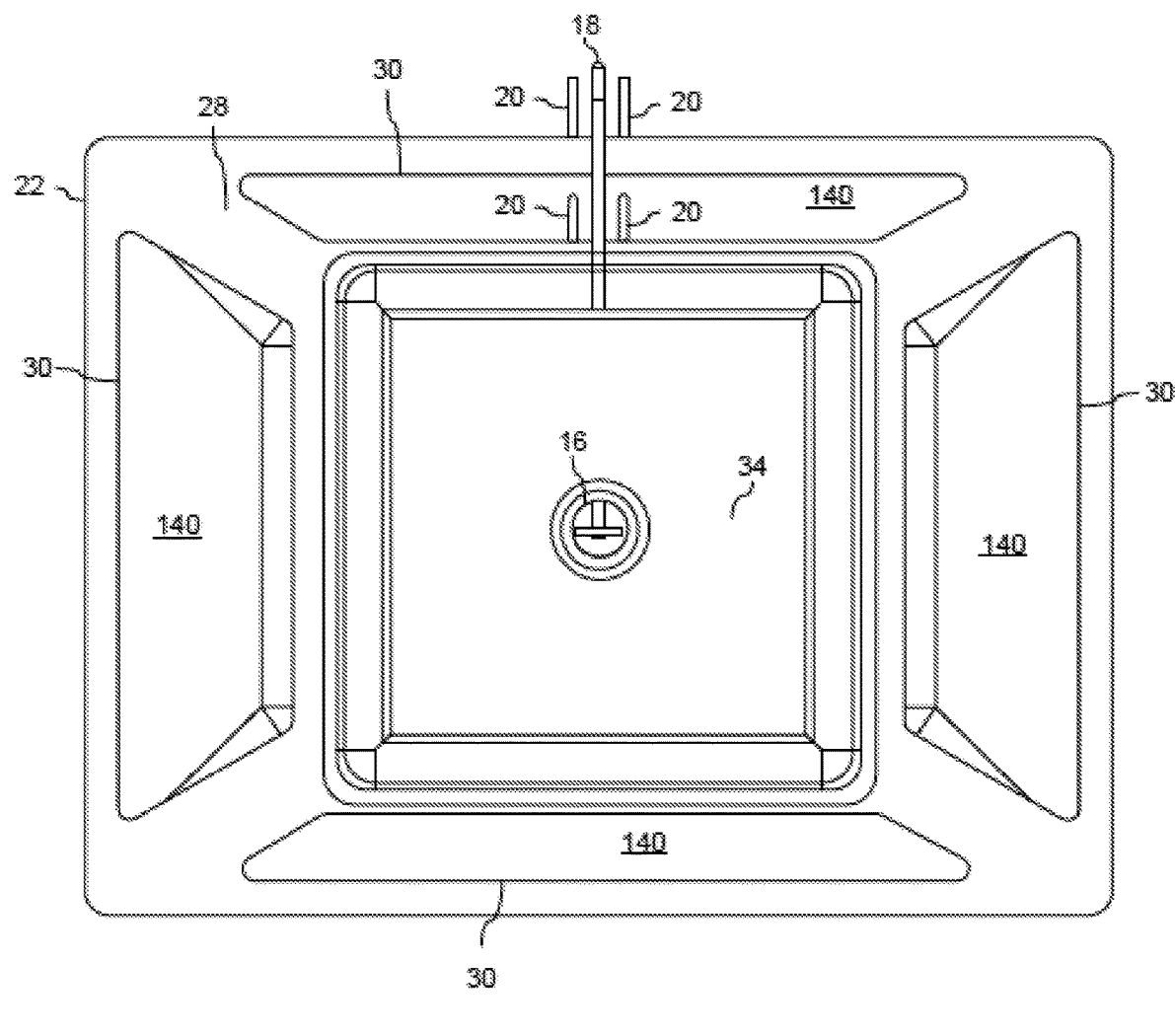
FIG. 4 is a top view of a modular steam production system according to an exemplary embodiment of the invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Referring now to FIGS. 1-12, exemplary embodiments of a modular steam production system, and a home cooking appliance having a modular steam production system, will now be described.

As shown in FIGS. 1-4, an example of a modular steam production system 10 can include a self-contained water reservoir 12 having a controlled water release system 13 and a steam generating unit 14. The water reservoir 12 and the steam generating unit 14 can be integrally formed or separate components. A flange 22 can be provided on one or more of the water reservoir 12 and the steam generating unit 14 to facilitate handling of the modular steam production system 10 by a user and portability of the modular steam production system 10, such as during filling of the water reservoir 12 with water, positioning of the modular steam production system 10 in a home cooking appliance, and/or removing the modular steam production system 10 from a home cooking appliance.

The modular steam production system 10 can include a fill port 16 formed on an upper surface 34 of the self-contained water reservoir 12 for filling a quantity of water into an interior cavity of the water reservoir 12. The fill port 16 can be configured such that the fill opening is unsealed, thereby reducing or avoiding a risk of pressurization or over-pressurization of the modular steam production system 10. In the illustrated example, the fill port 16 can include an elongated and/or tapered neck/neck down portion 42 to reduce a risk of boil-over or spilling during positioning of the modular steam production system 10 in a home cooking appliance and/or during generation of steam by the modular steam production system 10.

The steam generating unit 14 can include a body forming a steam cavity 140 therein, as will be described in greater detail below. The body of the steam generating unit 14 can include a lower surface or lower wall 24 for supporting the modular steam production system 10 in a home cooking appliance, such as on a wire rack of an oven. The steam generating unit 14 can include one or more sloped, tapered, or curved side walls 26 for promoting and/or guiding a flow of steam generated by the steam generating unit 14 from within the steam cavity 140 toward one or more steam vents 30 (e.g., openings) formed in one or more surfaces of modular steam production system 10, such as an upper surface 28. The steam vents 30 can be configured to fluidly connect the steam cavity 140 to ambient or the exterior of the modular steam production system 10 (e.g., to ambient of a cooking cavity of a home cooking appliance).

As will be described in greater detail below, the water reservoir 12 can include a controlled water release system 13 therein for supplying water from the water reservoir 12 onto a heater within the steam generating unit 14. The modular steam production system 10 can include one or more connections (e.g., one or more mechanical and/or electrical connections 18, 20) for actuating and controlling the operation of the controlled water release system 13 of the water reservoir 12 and/or the operation of the steam generating unit 14.

Figure 5A:
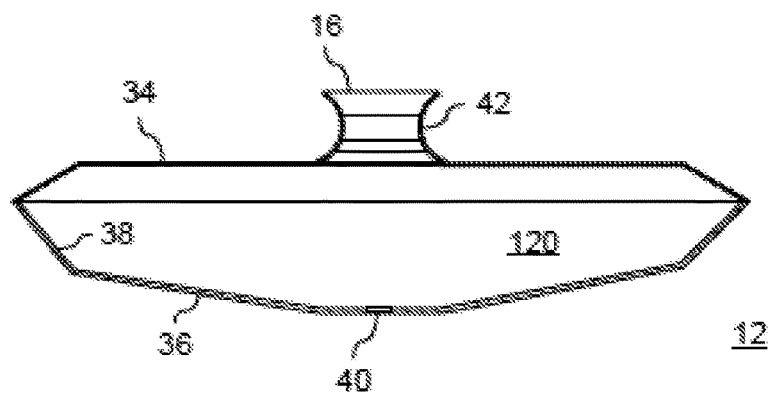
FIG. 5A is a partial side view of a water reservoir unit of a modular steam production system according to an exemplary embodiment of the invention.
Figure 5B:
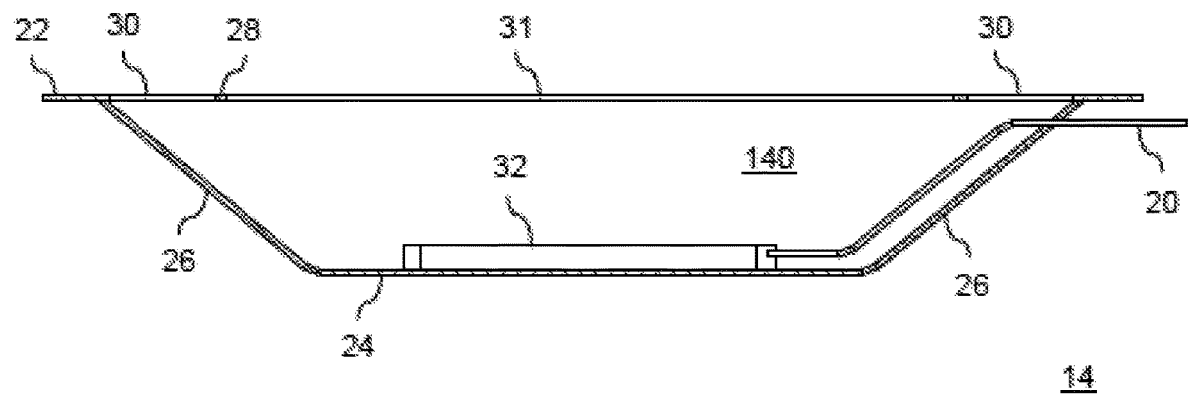
FIG. 5B is a partial side view of a steam generating unit of a modular steam production system according to an exemplary embodiment of the invention.

Referring to FIGS. 5A and 5B, in an example, the modular steam production system 10 can include a self-contained water reservoir 12 having a fill port 16 formed on an upper surface 34 of the self-contained water reservoir 12 and including an elongated and/or tapered neck/neck down portion 42. As shown in FIG. 5A, the water reservoir 12 can include a body forming a water reservoir cavity 120 therein for holding a quantity of water. The body of the water reservoir 12 can be formed from a unitary component or a plurality of components. An interior of the body of the water reservoir 12 can include one or more sloped, tapered, or curved walls 36, 38 for guiding a flow of the water within the reservoir cavity 120 toward an outlet opening 40 in a lower end or bottom of the water reservoir cavity 120. The outlet opening 40 can fluidly connect the water reservoir cavity 120 to the steam cavity 140 of the steam generating unit 14. In other examples, more than one opening can be provided for fluidly connecting the water reservoir cavity 120 to the steam cavity 140. In some examples, one or more of the exterior surfaces or walls of the body of the water reservoir 12 can be sloped, tapered, or curved to assist with promoting and/or guiding the flow of steam generated by the steam generating unit 14 from within the steam cavity 140 toward the one or more steam vents 30.

As shown in FIG. 5B, the steam generating unit 14 can include a body forming a steam cavity 140 therein. The body of the steam generating unit 14 can be formed from a unitary component or a plurality of components. The body of the steam generating unit 14 can include a lower surface or lower wall 24 for supporting the modular steam production system 10 in a home cooking appliance and one or more tapered or curved interior side walls 26 for promoting and/or guiding a flow of steam generated by the steam generating unit 14 from within the steam cavity 140 toward one or more steam vents 30, from which the steam can then exit to the exterior of the modular steam production system 10. In the example of FIGS. 5A and 5B, the water reservoir 12 can be separately formed from the steam generating unit 14, for example, with the steam generating unit 14 having an opening 31 formed in the upper surface 28 for receiving and supporting the water reservoir 12. In other examples, the water reservoir 12 and the steam generating unit 14 can be integrally formed.

Figure 6:
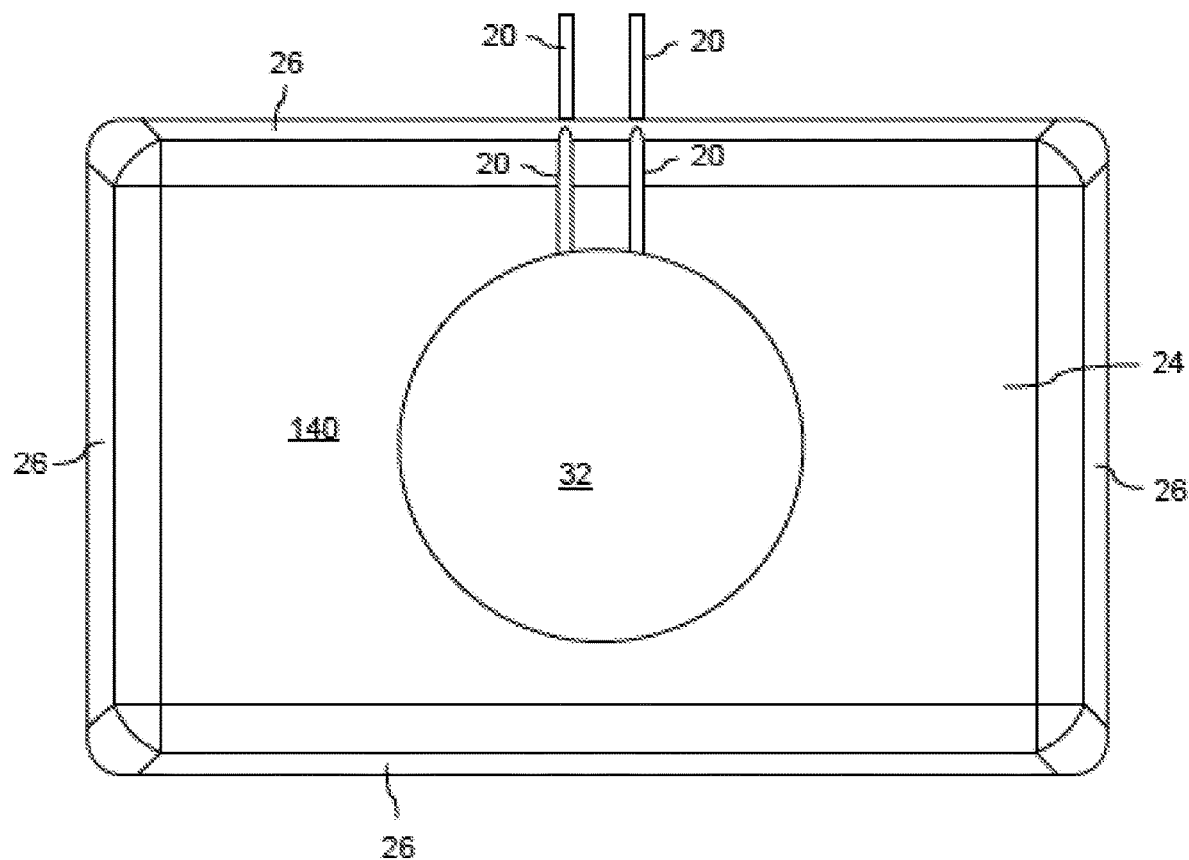
FIG. 6 is a cutaway top view of a steam generating unit of a modular steam production system according to an exemplary embodiment of the invention.

With reference again to FIG. 5B and to the cutaway view shown in FIG. 6, the steam generating unit 14 can include a heater 32 for generating steam from the water supplied to the steam generating unit 14 by the water reservoir 12. In the illustrated example, the steam generating unit 14 includes a heater 32 disposed below the outlet opening 40, which fluidly connects the water reservoir cavity 120 to the steam cavity 140. In some examples, the heater 32 can be disposed directly below the outlet opening 40 in a vertical direction such that the water from the reservoir cavity 120 flows from the outlet opening 40 directly onto at least a part of the heater 32, such as a top surface of the heater 32. In other examples, the heater 32 can be disposed in an offset position in the steam cavity 140 from the outlet opening 40 such that the water from the reservoir cavity 120 flows from the outlet opening 40 and then toward the heater 32. In the illustrated example, the steam generating unit 14 includes a single heater 32. In other examples, a plurality of heaters 32 or heating elements can be provided in the steam cavity. For example, the water reservoir 12 can include a plurality of openings 40 supplying water onto a plurality of heaters 32. The quantity of openings 40 can be different from the quantity of heaters 32, such that the quantity of openings 40 can be greater than the quantity of heaters 32 or the quantity of openings 40 can be less than the quantity of heaters 32. In an example, the water reservoir 12 can include a single outlet opening 40 supplying water to a plurality of heaters 32. In still another example, the water reservoir 12 can include a plurality of openings 40 supplying water to a single heater 32. The heater 32 is not limited to any particular size, shape, type, or arrangement of heater or heater element, and can include, for example, an electric water heater such as one or more of a hot plate, a resistance heater element, etc. or combinations thereof suitable for generating steam from the water supplied to the steam generating unit 14 by the water reservoir 12.

As shown in FIGS. 5B and 6, the modular steam production system 10 can include one or more connections 20 (e.g., one or more electrical connections) for powering and/or controlling the operation of the heater 32 of the steam generating unit 14. The connections 20 can extend from the heater 32 within the steam cavity 140 and penetrate a wall of the body of the steam generating unit 14 to the exterior of the modular steam production system 10 or from another component of the modular steam production system 10. In this example, the connections 20 extend from a rear of the modular steam production system 10. In other examples, the connections 20 can extend from other parts of the modular steam production system 10, such as from a side or top of the system 10. These connections 20 can be configured to engage (e.g., releasably engage) corresponding connections on a home cooking appliance, such as power ports on an interior wall of an oven cavity of a home cooking appliance, to supply power to the heater 32 from the home cooking appliance and/or to supply control signals to the heater 32 from a controller of the home cooking appliance.

Referring to FIGS. 7-10, an example of a modular steam production system 10 can include a self-contained water reservoir 12 having a controlled water release system 13 configured to regulate the opening and closing of the outlet opening 40 in the lower end or bottom of the water reservoir cavity 120, which fluidly connects the water reservoir cavity 120 to the steam cavity 140 of the steam generating unit 14. The controlled water release system 13 can include at least one valve 44 configured to regulate the opening and closing of the outlet opening 40 in the lower end or bottom of the water reservoir cavity 120 and a corresponding mechanical assembly coupling the valve 44 to the physical connection 18 of the modular steam production system 10 such that actuation of the connection 18 correspondingly actuates an opening and closing of the valve 44. In some examples, the controlled water release system 13 can be configured to regulate the valve 44 to provide an open or closed state with respect to the outlet opening 40 (e.g., a fully open or unsealed state or a fully closed or sealed state). In other examples, the controlled water release system 13 can be configured to regulate a degree or amount of opening of the valve 44 with respect to the outlet opening 40 in the lower end or bottom of the water reservoir cavity 120, thereby enabling varying volumes of water W to be supplied from the water reservoir cavity 120 to the steam cavity 140 when the valve 44 is in an open state and providing greater control of a volume of steam generated by the steam generating unit 14.

FIGS. 7-10 illustrate an example of a controlled water release system 13 including at least one valve configured to regulate the opening and closing of the outlet opening 40 in the lower end or bottom of the water reservoir cavity 120 and a corresponding mechanical assembly coupling the valve 44 to the physical connection 18 of the modular steam production system 10. In this example, the controlled water release system 13 includes a plunger-style valve and cam/follower assembly having a rod 50 with a valve 44 (e.g., a metal valve seal, rubber valve seal, etc.) fixed at or near a lower end 56 of the rod 50 and a follower plate 48 at the opposite end of the rod 50. The rod 50 is supported and guided by a guide plate 54, which is fixedly coupled to a surface of the water reservoir 12. A spring 52 is disposed between a surface of the follower plate 48 and a surface of the guide plate 54 and applies a force Fs to bias the follower plate 48 in a direction away from the guide plate 54. The rod 50 can be axially disposed within the coils of the spring 52, as shown, or disposed adjacent to the rod 50. In the example, the valve 44 is thereby biased by the spring 52 in an open position with respect to the outlet opening 40.

In the illustrated example, a rotating cam 46 engages a surface of the follower plate 48. The cam 46 can include a suitable cam profile, for example, depending on the desired amount of linear movement of the follower plate 48, rod 50, and valve 44 assembly, the desired rate and/or distance at which the valve 44 opens or closes with respect to the outlet opening 40, etc. The rotating cam 46 is fixedly coupled to a rotatable shaft 58, which extends to an exterior of the modular steam production system 10 and terminates at the first connection 18. The rotatable shaft 58 can be supported by one or more guide elements 60 disposed along a length of the shaft 58. The rotatable shaft 58 can extend from within the water reservoir cavity 120 to the exterior of the exterior of the modular steam production system 10 via an opening or penetration in the body of the water reservoir 12, such as in a tapered wall or sidewall of the self-contained water reservoir 12. In some examples, the opening or penetration in the body of the water reservoir 12 can be sealed around the rotatable shaft 58, for example, by a bushing or the like, to minimize a risk of spillage of water from the water reservoir 12 via the opening or penetration around the shaft 58. The first connection 18 of the rotatable shaft 58 can be configured to be mechanically connected to a corresponding connection on a home cooking appliance to impart rotation to the shaft 58, which correspondingly imparts rotation to the cam 46, in a manner similar to a rotisserie. The corresponding connection of the home cooking appliance can be powered by a motor within or external to the cooking compartment of the home cooking appliance.

The valve 44 can be sized and shaped to fluidly seal the outlet opening 40 in the lower end or bottom of the water reservoir cavity 120 when the valve 44 is within the outlet opening 40 by physically connecting a perimeter of the outlet opening 40 and/or an inner surface of the outlet opening 40 and/or physically contacting the surface of the water reservoir cavity 120 surrounding the outlet opening 40. In some examples, when the valve 44 is in a closed position, the pressure exerted on the valve 44 by the water W in the water reservoir cavity 120 can further promote a sealed state between the valve 44 and the inner surface of the outlet opening 40 and/or between the valve 44 and the surface of the water reservoir cavity 120 surrounding the outlet opening 40. The valve 44 can include one or more cylindrical shaped portions configured to engage and seal the interior or surrounding areas of the outlet opening 40, similar to the illustrated example. In other examples, the valve 44 can have a conical profile, a tapered profile, a stepped-profile, etc. configured to engage and seal the outlet opening 40 as the valve 44 is inserted or lowered into the outlet opening 40. In some examples, the outlet opening 40 can form a valve seat, such as a tapered seat) corresponding to the size, shape, profile, etc. of portions of the valve 44 to promote sealing between the valve 44 and the outlet opening 40. One of ordinary skill in the art will understand that other suitable seal and opening arrangements, or combinations thereof, are contemplated by the invention.

In the example illustrated in FIGS. 7-10, the rod 50 can be movable linearly up and down in a direction corresponding to the axis of the outlet opening 40 such that the valve 44 is movable from a first, sealed or closed position in which the plunger seals the outlet opening 40 in the water reservoir to block or prevent a fluid connection between the water reservoir cavity 120 and the steam cavity 140, and a second, unsealed or open position in which a gap or clearance is present between the valve 44 and the outlet opening 40 such that a fluid connection is provided between the water reservoir cavity 120 and the steam cavity 140.

Figure 7:
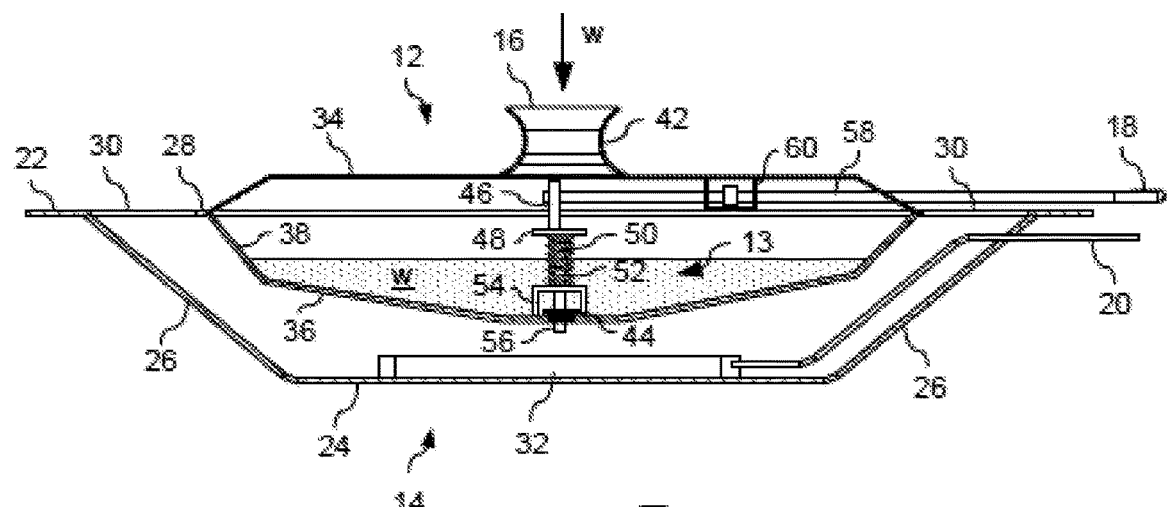
FIG. 7 is a side, cross-sectional view of a modular steam production system according to an exemplary embodiment of the invention.
Figure 9:
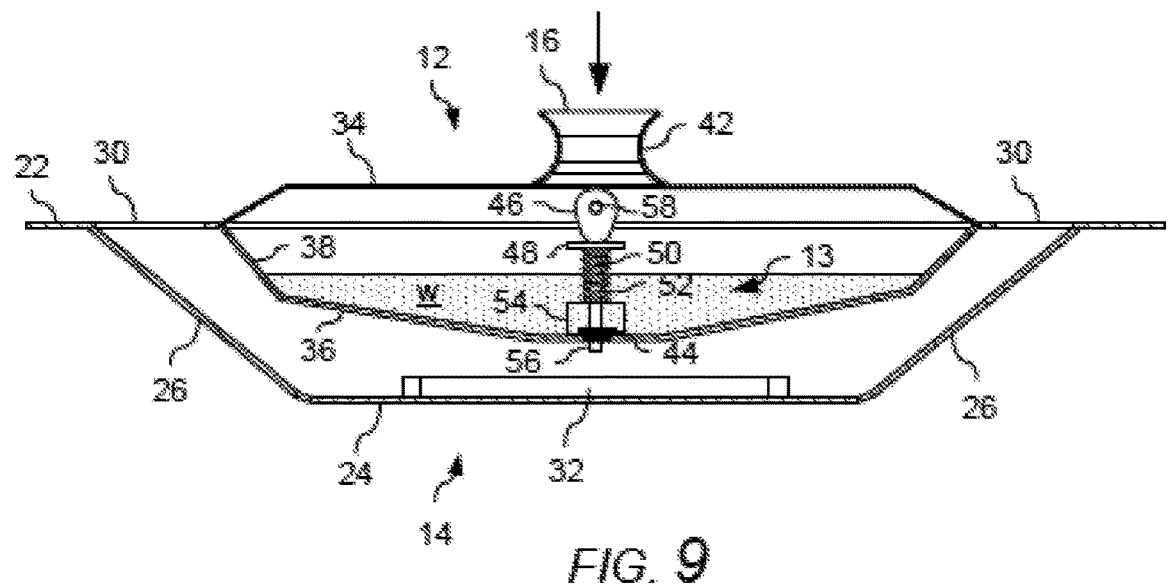
FIG. 9 is a front, cross-sectional view of a modular steam production system according to an exemplary embodiment of the invention.

As shown in FIGS. 7 and 9, in a closed state of the valve 44, the follower plate 48 is forced downward by the cam 46 (overcoming the bias of the spring force Fs), thereby correspondingly moving the rod 50 and valve 44 in an axial direction with respect to the outlet opening 40 of the water reservoir 12 such that the valve 44 seals the outlet opening 40 and blocks/prevents a fluid connection between the water reservoir cavity 120 and the steam cavity 140.

Figure 8:
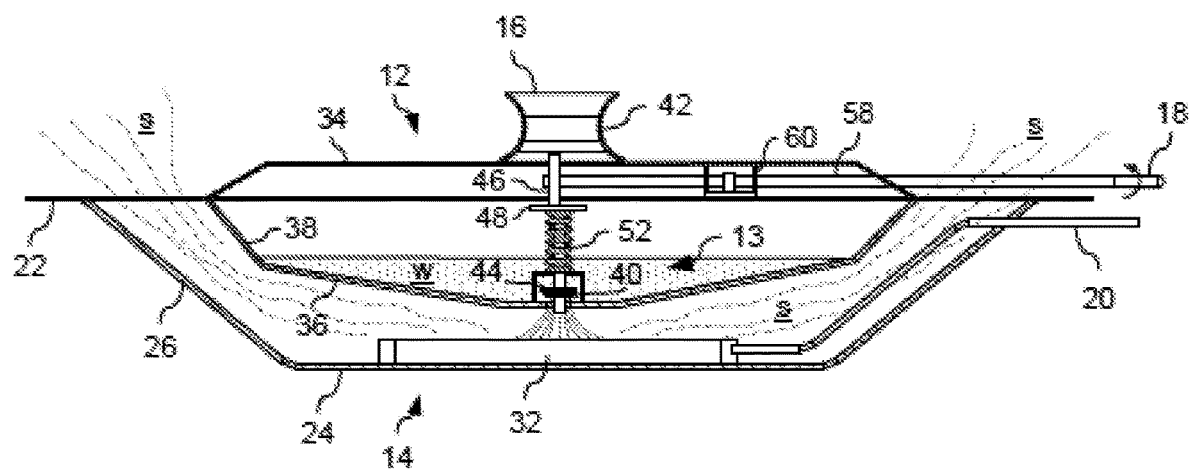
FIG. 8 is another side, cross-sectional view of the modular steam production system according to the exemplary embodiment of FIG. 7.
Figure 10:
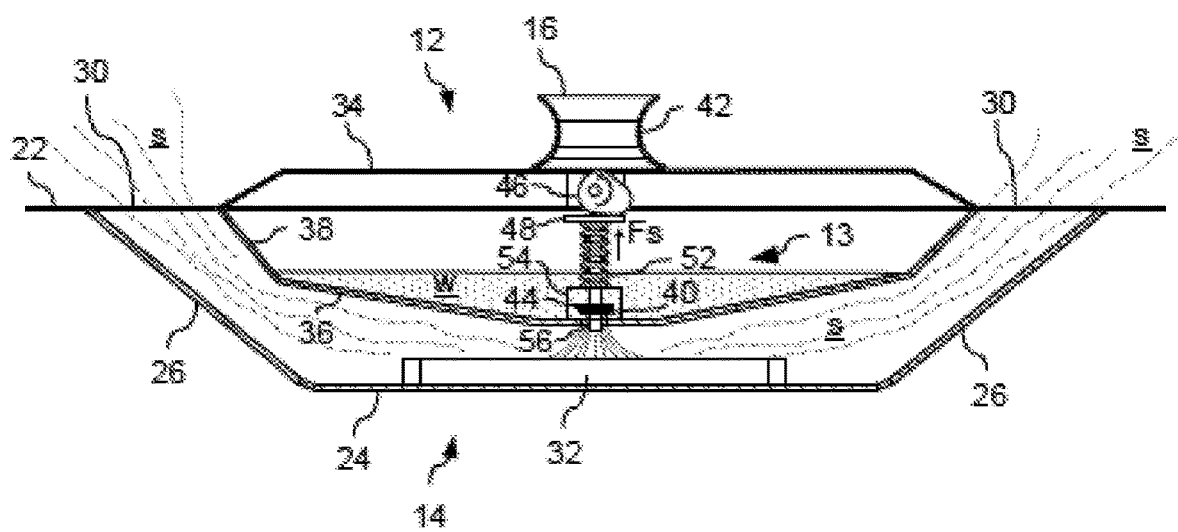
FIG. 10 is another front, cross-sectional view of a modular steam production system according to the exemplary embodiment of FIG. 9.

As shown in FIGS. 8 and 10, as the shaft 58 is rotated, the cam 46 correspondingly is rotated, thereby permitting the follower plate 48 to be forced upward by the spring force Fs, which correspondingly moves the rod 50 and valve 44 in an axial direction away from the outlet opening 40 of the water reservoir 12 and provides a gap or clearance between the valve 44 and the outlet opening 40 in the water reservoir 12 such that a fluid connection is present between the water reservoir 12 and the steam cavity 14. A quantity of water W is thereby permitted to flow under a force of gravity from the water reservoir 12 into the steam cavity 14. As the cam 46 rotates, the cam profile of the cam 46 can cause the valve 44 to gradually or continuously move by a larger amount up to a maximum opening value of the valve 44 with respect to the outlet opening 40, thereby permitting differing volumes of water W to flow into the steam cavity 14. The cam 46 can be rotated further, thereby causing the valve 44 to gradually or continuously move from the maximum opening value back to the closed or sealed position. In some examples, the shaft 58 and cam 46 can be rotated (e.g., continuously) in a single direction, thereby causing an up and down motion (i.e., opening and closing motion) of the valve 44 with respect to the outlet opening 40 based on the cam profile, speed of rotation, etc. In other examples, the shaft 58 and cam 46 can be oscillated between a first direction and a second, opposite direction, thereby causing an up and down motion (i.e., opening and closing motion) of the valve 44 with respect to the outlet opening 40 based on the cam profile, speed of oscillation, etc. In some examples, the shaft 58 and cam 46 can be rotated (e.g., in one direction or both directions) by an amount to cause the valve 44 to move to an intermediate opening value (e.g., less than a maximum opening value). The rotation of the shaft 58 and cam 46 is not limited to gradual or continuous rotation, but can include intermittent rotation over equally spaced time periods or over varying time periods. For example, the movement of the valve 44 can permit water W to flow intermittently into the steam cavity 14 and/or can permit differing volumes of water W to flow in the steam cavity 14 over time.

With reference again to FIGS. 8 and 10, in this example, the opening of the valve 44 with respect to the outlet opening 40 permits the water W to flow (e.g., directly) onto a surface of the heater 32 within the steam cavity 14, where the water W is heated by the heater 32 and converted to a volume of steam S. The steam S generated by the heater 32 can flow within the steam cavity 140 toward the one or more steam vents 30. As shown in FIGS. 8 and 10, the tapered or curved interior side walls 26 of the steam generating unit 14 and/or the sloped, tapered, or curved exterior surfaces of the body of the water reservoir 12 can assist with promoting and/or guiding the flow of generated steam S toward the one or more steam vents 30 from which the steam S can then exit to the exterior of the modular steam production system 10.

The controlled water release system 13 is not limited to the illustrated examples and can include other suitable seals, valve assemblies, arrangements, or combinations thereof.

For example, the controlled water release system 13 can include a variety of cam profiles suitable for providing the desired movement of the valve 44 with respect to the outlet opening 40. The follower 48 is not limited to a plate follower and can include other types of followers, such as an oscillating follower, roller follower, among other types of followers. The cam 46 is not limited to a rotating cam and can include other types of cams, such as a wedge cam. In the example of a wedge cam, the shaft 58 can be configured to impart a linear motion on the wedge cam (e.g., in a direction perpendicular to the axis of the outlet opening 40) having a slope causing the follower plate 48 to move linearly up and down in the direction of the axis of the outlet opening 40. In other examples, the controlled water release system 13 can be configured to be actuated in a variety of suitable manners, such as mechanically actuated, electrically actuated, pneumatically actuated, hydraulically actuated, etc. The controlled water release system 13 can be configured to be biased in either an open or closed position, or a neutral or unbiased position. In other examples, the controlled water release system 13 can include various types or arrangements of valves or seals, such as a plunger, flap, gate valve, ball valve, butterfly valve, or other mechanical valve that is movable between a sealed or closed position to block or prevent a fluid connection between the water reservoir cavity 120 and the steam cavity 140, and one or more unsealed or open positions in which the outlet opening 40 is unsealed to allow a fluid connection between the water reservoir cavity 120 and the steam cavity 140.

Figure 11:
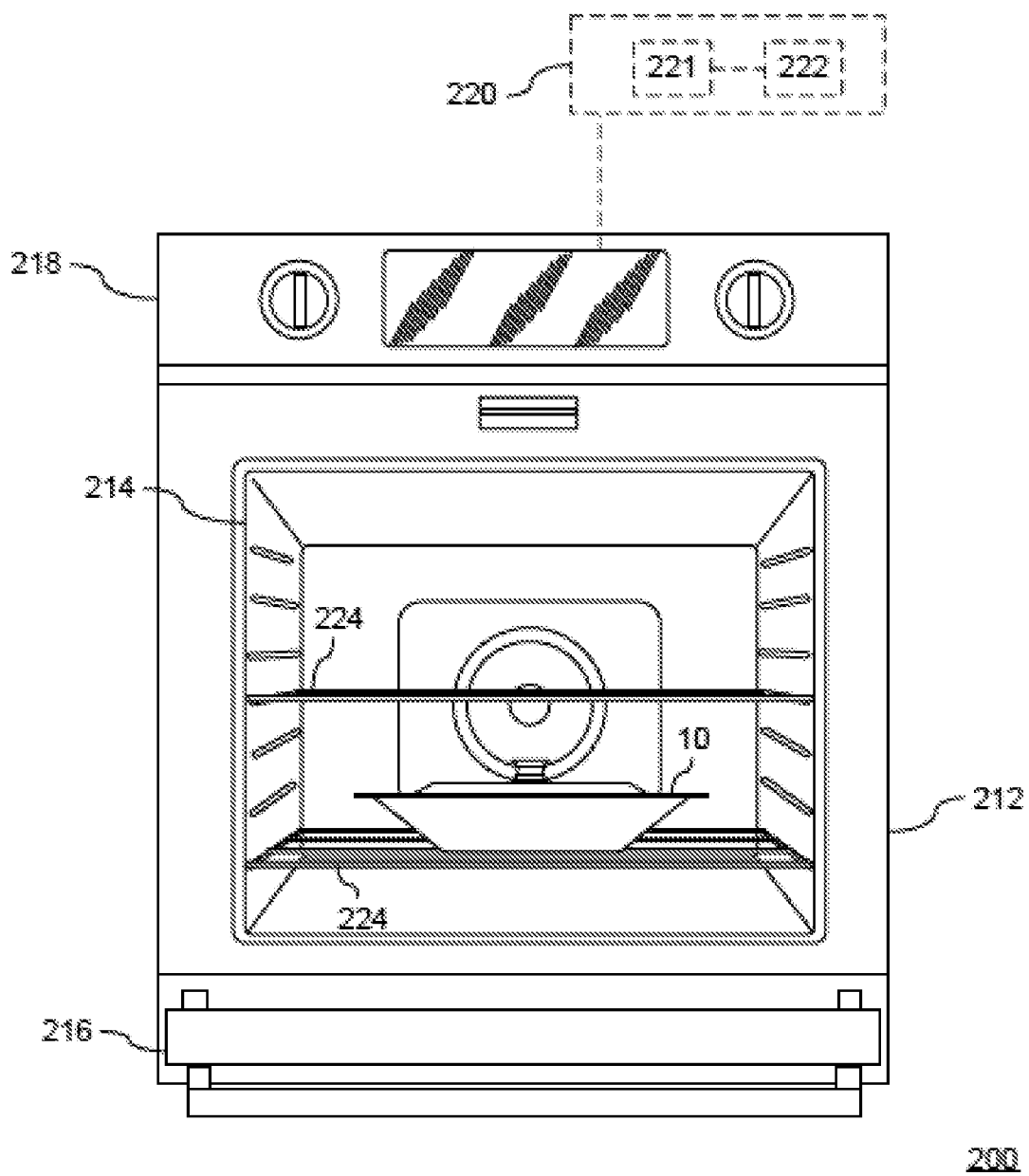
FIG. 11 is a front view of a home cooking appliance having a modular steam production system according to an exemplary embodiment of the invention.
Figure 12:
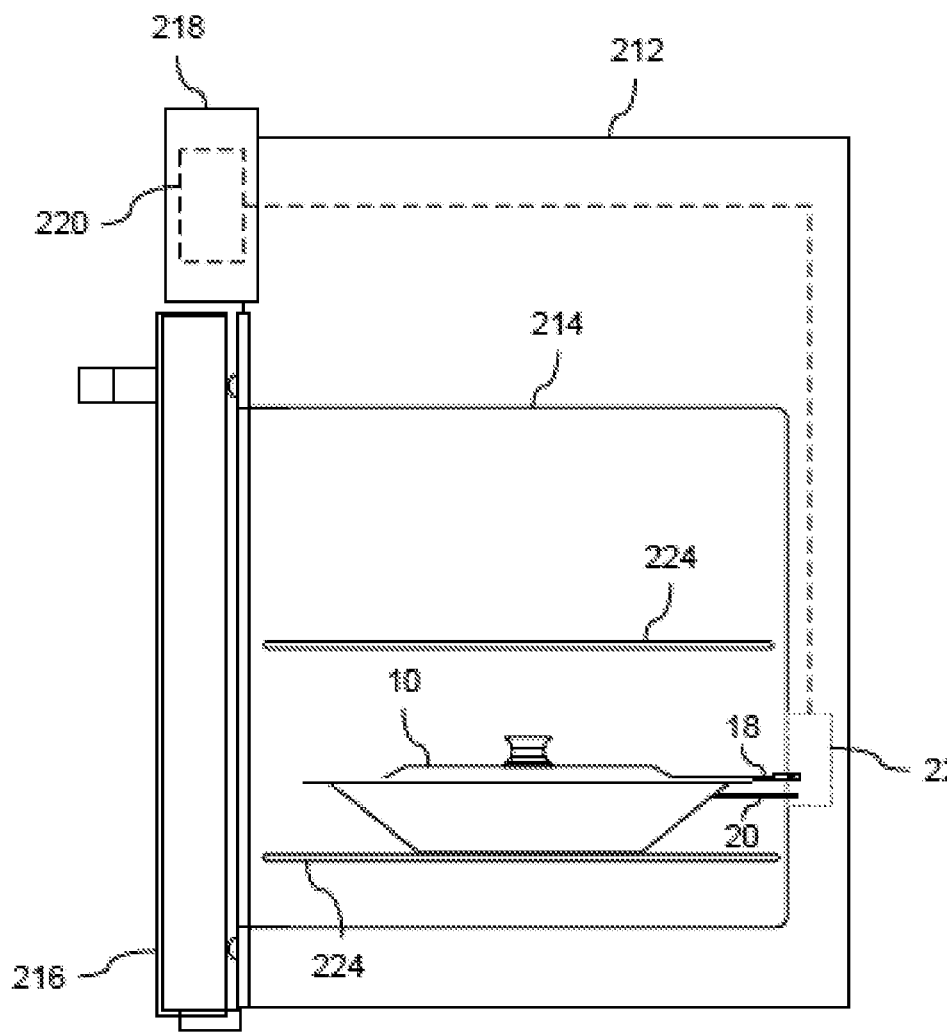
FIG. 12 is a side, cut-away view of a home cooking appliance having a modular steam production system according to an exemplary embodiment of the invention.

With reference to FIGS. 11 and 12, an example of a home cooking appliance 200 having a modular steam cooking unit 10 will now be described.

The home cooking appliance 200 can include a housing 212 having a cooking compartment 214 accessible via a door 216. The cooking compartment 214 can include one or more racks 224 for receiving and supporting a modular steam production unit 10. The home cooking appliance 200 according to the invention can include, for example, a standalone appliance, wall mounted appliance, such as a stand-alone oven, wall mounted oven, double oven, combination oven, countertop oven, microwave oven, air fryer, or a freestanding range having one or more gas or electric cooking or warming devices, such as an oven, steam oven, convection oven, and/or warming drawer. One of ordinary skill will recognize that other configurations are possible.

The home cooking appliance 200 can include a control panel 218 having one or more user input devices, such as one or more control knobs, touch sensitive input devices, etc., for controlling operation of one or more gas or electric heating elements, circulating fans, etc. in the cooking compartment 214 for performing a preheat operation, cooking operation, warming operation, etc. The home cooking appliance 200 can include a controller or control unit 220 comprising, for example, a processor or computation unit 221, a memory unit 222, and an operating program which is stored in the memory unit 222 and executed by the processor or computation unit 221. The control unit 220 can be provided for controlling one or more cooking processes, controlling one or more operations or functions of various components of the appliance 200, controlling operation of one or more components of the modular steam production unit 10 or other components related to the operation of the modular steam production unit 10, among other things.

As shown in FIG. 12, the exemplary home cooking appliance 200 can further include a connection unit 226 having one or more connections, ports, or the like for receiving one or more connections 218, 220 of a modular steam cooking unit 10, according to the examples of the present invention. For example, the connection unit 226 can be configured to supply power to the modular steam cooking unit 10, such as to supply power to the heater 32, send and/or receive control signals to/from the modular steam cooking unit 10 to control operation of the heater 32, to provide motive power to one or more components of the modular steam cooking unit 10, such as to actuate the controlled water release system 13 (e.g., by rotating the shaft 58), among other things. The components of the connection unit 226 can be arranged in communication with the control unit 220. In addition to controlling one or more operations or functions of various components of the appliance 200, the control unit 220 can be provided for controlling the operation of the self-contained water reservoir 12 having a controlled water release system 13, the steam generating unit 14, etc. via the connection of the connections 218, 220 of the modular steam cooking unit 10 with the connection unit 226. In some examples, the home cooking appliance 200 can include a motor configured to actuate the cam 46 by rotating the shaft 58 of the modular steam cooking unit 10. The motor can be integrated into the connection unit 226 or provided separately on the appliance 200. The motor can be a continuous speed motor or a variable speed motor. The speed of the motor or variation of the speed of the motor can be controlled by the control unit 220 of the appliance 200. In other examples, a timer or the like can be provided to control activation of the motor. The speed of the motor can be selected or modified by the control unit 220, for example based on a user input, a steam cooking operation control program or cycle, or the like, to provide a desired rate of water release onto the heater 32 of the steam generator unit 14, thereby enabling the modular steam cooking unit 10 to provide various release rates corresponding to different volumes of steam within the cooking compartment 214.

In some examples, the connection unit 226 can be configured to rotate (e.g., continuously or intermittently) the shaft 58 in a single direction. In other examples, the connection unit 226 can be configured to oscillate the shaft 58 between a first direction and a second, opposite direction. In some examples, the connection unit 226 can be configured to rotate the shaft 58 (e.g., in one direction or both directions) by different amounts. The connection unit 226 can be configured to rotate the shaft 58 gradually or continuously, or intermittently over equally spaced time periods (e.g., equal timing) or over varying time periods (e.g., variable timing).

With reference again to FIGS. 11 and 12, in operation, a user can fill the water reservoir 12 with a predetermined quantity of water via the fill port 16 and then transport and position the modular steam production system 10 within the cooking compartment of the home cooking appliance 200 (for example, by grasping the flanges 22 of the modular steam production system 10), more particularly, position the modular steam production system 10 on a predetermined support rack 224 within the cooking compartment 214 of the home cooking appliance 200 (e.g., slide-in installation). The connections 18, 20 of the modular steam production system 10 can be aligned and coupled, engaged, or connected (e.g., physically or electrically connected) with the appropriate points of the corresponding connections of the connection unit 226 within the cooking compartment 214, and in some examples, automatically aligned and coupled, engaged, or connected with the appropriate points of the corresponding connections of the connection unit 226 based on the particular placement of the modular steam production system 10 in the cooking compartment 214.

By way of example, with reference to the modular steam production system 10 in FIGS. 7-10, the shaft 58 can extend from the cam 46 within the water reservoir 12 and penetrate a wall of the body of the water reservoir 12 to the exterior of the modular steam production system 10 and terminate at the connection 18. The connection 18 can be configured to engage (e.g., automatically engage) a corresponding connection in the connection unit 226 on the home cooking appliance 200 to actuate or impart motion (e.g., rotational motion) to the connection 18, thereby driving or turning the shaft 58 and cam 46. The user can then position food stuff to be cooked within the cooking compartment 214, such as on another rack 224 located above the modular steam production system 10. Next, the user can initiate a steam cooking operation to be performed by the home cooking appliance 200, for example, using the control panel 218 of the home cooking appliance 200. Optionally, the user can select a desired steam cooking operation or program from predetermined programs stored in a memory unit of the control unit 220 using the control panel 218. The control unit 220 can control the connection unit 226 to turn the shaft 58 (e.g., using a motor), which correspondingly rotates the cam 46, thereby pushing the spring-loaded follower plate 48 and causing the rod 50 and valve 44 to move in an up and down motion, which opens and closes the outlet opening 40 in the bottom of the water reservoir 12. The control unit 220 also can control the connection unit 226 to supply power to the heater 32. As the cam 46 rotates, a quantity of water W is thereby permitted to flow under a force of gravity from the water reservoir 12 into the steam cavity 14, and more particularly, in this example, to flow directly onto a surface of the heater 32 in the steam cavity 14 to generate steam S. The steam S generated by the heater 32 can flow within the steam cavity 140 toward the one or more steam vents 30, and then exit from the modular steam production system 10 into the cooking compartment 214 to cook the food stuff therein.

Upon completion of a steam cooking operation, or if a conventional baking or convection cooking operation is desirable, the user can decouple, disengage, or disconnect (e.g., physically or electrically disconnect) the connections 18, 20 of the modular steam production system 10 from the appropriate points of the corresponding connections of the connection unit 226 by withdrawing and removing the modular steam production system 10 from the cooking compartment 214 (for example, by grasping the flanges 22 of the modular steam production system 10). In this way, the home cooking appliance 200 can be configured to operate as both a conventional oven when a modular steam cooking unit 10 is removed from the cooking compartment 214 and as a steam oven when a modular steam cooking unit 10 is positioned within the cooking compartment 214 and connected to the connection unit 226.

The present invention has been described herein in terms of several preferred embodiments. However, modifications and additions to these embodiments will become apparent to those of ordinary skill in the art upon a reading of the foregoing description. It is intended that all such modifications and additions comprise a part of the present invention to the extent that they fall within the scope of the several claims appended hereto.

What is claimed is:

1. A modular steam production system for a home cooking appliance, the system comprising:
    a steam generating unit having a heating element for generating steam from water;
    a water reservoir for storing a quantity of the water, the water reservoir being fluidly coupled to the steam generating unit;
    a controlled water release system including a valve movable between a closed position and an open position to control a release of the water from the water reservoir into the steam generating unit and thereby controlling a volume of steam generated by the steam generating unit;
    a mechanical connection configured to engage a corresponding mechanical connection on the home cooking appliance to provide motive power to the controlled water release system to actuate an opening and closing of the valve, and
    at least one vent fluidly connecting a steam cavity of the steam generating unit to an exterior of the modular steam production system,
    wherein an exterior surface of the water reservoir facing the steam cavity is tapered to guide the generated steam to the at least one vent.

2. The modular steam production system of claim 1, wherein the valve controls a rate of release of the water from the water reservoir into the steam generating unit.

3. The modular steam production system of claim 2, wherein the valve provides a variable rate of release of the water from the water reservoir into the steam generating unit.

4. The modular steam production system of claim 1, wherein the valve provides an intermittent release of the water from the water reservoir into the steam generating unit.

5. The modular steam production system of claim 1, further comprising at least one electrical connection configured to engage a corresponding electrical connection on the home cooking appliance to provide power from the home cooking appliance to the heating element of the steam generating unit.

6. The modular steam production system of claim 1, further comprising a fill port fluidly coupled to the water reservoir for supplying the quantity of the water to the water reservoir, wherein the fill port is an unsealed opening fluidly connected to the water reservoir.

7. The modular steam production system of claim 6, wherein the fill port includes an elongated neck.

8. The modular steam production system of claim 1, wherein an interior surface of the steam cavity is tapered to guide the generated steam to the at least one vent.

9. The modular steam production system of claim 1, wherein an interior surface of the water reservoir is tapered to guide the water to the valve.

10. The modular steam production system of claim 1, wherein the water reservoir includes an outlet opening fluidly connecting an interior cavity of the water reservoir to the steam cavity of the steam generating unit, and
wherein the valve is movable between the closed position and the open position to regulate a sealing and an unsealing of the outlet opening.

11. The modular steam production system of claim 10, wherein the controlled water release system further comprises:
a rod having the valve fixed at a first end thereof and a follower plate fixed at a second end thereof, wherein an assembly of the rod, valve, and follower plate are movable linearly together in a direction of an axis of the outlet opening;
a spring disposed between the follower plate and the outlet opening and biasing the follower plate in a direction away from the outlet opening;
a cam having a surface defining a cam profile, wherein the surface of the cam engages the follower plate; and
a shaft fixed to the cam and coupling the cam to the mechanical connection.

12. The modular steam production system of claim 11, wherein the cam is rotatable by rotating the shaft via the mechanical connection.

13. A household appliance comprising the modular steam production system of claim 1, the household appliance including:
a housing having a cooking compartment, wherein the modular steam production system is disposed in the cooking compartment; and
the corresponding mechanical connection is disposed within the cooking compartment,
wherein the mechanical connection of the modular steam production system is engaged with the corresponding mechanical connection, and
wherein the corresponding mechanical connection provides the motive power to the controlled water release system via the mechanical connection to actuate the opening and closing of the valve.

14. The household appliance of claim 13, further comprising:
a control unit configured to control operation of the corresponding mechanical connection to control a rate of release of the water by the valve from the water reservoir into the steam generating unit.

15. The household appliance of claim 14, wherein the control unit is configured to control the operation of the corresponding mechanical connection to provide a variable rate of release of the water by the valve from the water reservoir into the steam generating unit.

16. The household appliance of claim 13, wherein the water reservoir of the modular steam production system includes an outlet opening fluidly connecting an interior cavity of the water reservoir to the steam cavity of the steam generating unit and the valve is movable between the closed position and the open position to regulate a sealing and an unsealing of the outlet opening, and
wherein the controlled water release system further comprises:
a rod having the valve fixed at a first end thereof and a follower plate fixed at a second end thereof, wherein an assembly of the rod, valve, and follower plate are movable linearly together in a direction of an axis of the outlet opening;
a spring disposed between the follower plate and the outlet opening and biasing the follower plate in a direction away from the outlet opening;
a cam having a surface defining a cam profile, wherein the surface of the cam engages the follower plate; and
a shaft fixed to the cam and coupling the cam to the mechanical connection.

17. The household appliance of claim 16, further comprising:
a motor coupled to the corresponding mechanical connection and configured to rotate the shaft via the mechanical connection; and
a control unit configured to control operation of the motor, wherein the control unit is configured to control a rate of release of the water by the valve from the water reservoir into the steam generating unit by controlling a speed of rotation of the shaft by the motor via the corresponding mechanical connection.

* * * * *